United States Patent
Bohn et al.

(10) Patent No.: US 9,652,225 B1
(45) Date of Patent: May 16, 2017

(54) DEVELOPMENT COMMUNITY ASSESSMENT VIA REAL-TIME WORKSPACE MONITORING

(71) Applicant: International Business Machines Corporation, Armonk, NY (US)

(72) Inventors: Timothy T. Bohn, Simi Valley, CA (US); Diana C. Costantino, West Hills, CA (US); Bradley C. Herrin, Marina Del Rey, CA (US); Ian G. M. Hill, Northfield, NH (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 14/987,545

(22) Filed: Jan. 4, 2016

(51) Int. Cl.
*G06F 9/44* (2006.01)
*G06F 11/36* (2006.01)
*G06F 17/30* (2006.01)

(52) U.S. Cl.
CPC ............... *G06F 8/70* (2013.01); *G06F 8/30* (2013.01); *G06F 11/362* (2013.01); *G06F 11/3664* (2013.01); *G06F 17/30* (2013.01)

(58) Field of Classification Search
USPC ...................................................... 717/103
See application file for complete search history.

(56) References Cited

U.S. PATENT DOCUMENTS

| | | |
|---|---|---|
| 5,230,049 A | 7/1993 | Chang et al. |
| 7,568,109 B2 | 7/2009 | Powell, Jr. et al. |
| 7,584,453 B2 | 9/2009 | Bayardo et al. |
| 7,805,702 B2 | 9/2010 | Jacovi et al. |
| 7,814,426 B2 | 10/2010 | Huesken et al. |

(Continued)

FOREIGN PATENT DOCUMENTS

CN 102760058 A 10/2012

OTHER PUBLICATIONS

Blincoe et al., "Proximity: a measure to quantify the need for developers' coordination," Proceedings of the ACM 2012 conference on Computer Supported Cooperative Work, New York, NY, Feb. 15, 2012, 2 pgs of the abstract only.

(Continued)

*Primary Examiner* — Marina Lee
(74) *Attorney, Agent, or Firm* — Shumaker & Sieffert, P.A.

(57) ABSTRACT

Techniques are described for development community assessment via real-time workspace monitoring. In one example, a method includes outputting, to one or more servers, a first developer registration information for a developer matching service, and downloading an agent associated with the developer matching service to a developer workspace on the client, wherein the agent is configured to monitor the developer workspace. The method further includes outputting, to the servers, data obtained from monitoring the developer workspace by the agent, and receiving, from the servers, a message that a correspondence has been identified between code in the development environment and code in a second development environment registered with the developer matching service. The method further includes establishing a connection between the client and a collaboration platform including a social coding service that facilitates collaboration between the first and second development environments.

20 Claims, 4 Drawing Sheets

(56) References Cited

U.S. PATENT DOCUMENTS

| | | | | |
|---|---|---|---|---|
| 8,239,839 | B2* | 8/2012 | Rossmann | G06F 11/3644 717/124 |
| 8,478,717 | B2* | 7/2013 | Vedula | G06F 17/30091 707/608 |
| 8,543,926 | B2* | 9/2013 | Giles | G06Q 10/10 345/419 |
| 8,572,560 | B2 | 10/2013 | Drissi et al. | |
| 8,739,112 | B1 | 5/2014 | Reed et al. | |
| 9,223,567 | B2* | 12/2015 | Deluca | G06Q 50/01 |
| 2004/0243968 | A1* | 12/2004 | Hecksel | G06F 8/20 717/100 |
| 2005/0097508 | A1* | 5/2005 | Jacovi | G06F 9/4446 717/103 |
| 2005/0234943 | A1* | 10/2005 | Clarke | H04L 67/38 |
| 2008/0134298 | A1 | 6/2008 | Nathan et al. | |
| 2009/0089682 | A1* | 4/2009 | Baier | G06Q 10/10 715/751 |
| 2011/0004790 | A1* | 1/2011 | Rossmann | G06F 11/3644 714/27 |
| 2012/0023129 | A1* | 1/2012 | Vedula | G06F 17/30091 707/769 |
| 2013/0014023 | A1* | 1/2013 | Lee | G06Q 10/103 715/751 |
| 2013/0218867 | A1* | 8/2013 | DeLuca | G06Q 50/01 707/722 |

OTHER PUBLICATIONS

Bani-Salameh, "A Social Collaborative Virtual Environment for Software Development," Proceedings of the International Symposium on Collaborative Technologies and Systems (CTS), Chicago, USA, May 17-21, 2010, pp. 46-55.

Aragon Consulting Group, Inc., "Sharing—The Problem of Sharing Barriers," Krugle, Retrieved from <http://www.krugle.com/sharing.php> on Aug. 6, 2015, 3 pgs.

Valetto et al., "Actionable Identification of Emergent Teams in Software Development Virtual Organizations," 2012 IEEE RSEE, Zurich, Switzerland, Retrieved from <http://seangoggins.net/sites/default/files/ValettoBlincoeGoggins-RecommendersforSOftware.pdf> on Jan. 4, 2016, pp. 11-15.

* cited by examiner

DEVELOPMENT COMMUNITY ASSESSMENT VIA REAL-TIME WORKSPACE MONITORING

TECHNICAL FIELD

The disclosure relates to developer software, and particularly to development community assessment via real-time workspace monitoring.

BACKGROUND

Since the beginning of software development, developers have attempted to reuse code such as via the use of shared software libraries and repositories. Software repositories both public and private are utilized by software developers to reuse previously developed solutions to software engineering development problems. This is particularly true of large software projects such as those produced by large enterprises or by the open source community. Searching tools allow developers to search for solutions to problems they are attempting to solve so that they do not have to write redundant code and instead may be able to reuse code previously developed for the same or different end product.

SUMMARY

In one aspect of the invention, a method includes outputting, for communication to one or more servers, a first developer registration information for a developer matching service. The method further includes downloading an agent associated with the developer matching service to a first developer workspace on the client, wherein the first developer workspace comprises a first development environment, and wherein the agent is configured to monitor the first developer workspace. The method further includes outputting, for communication to the one or more servers, data obtained from monitoring of the first developer workspace by the agent. The method further includes receiving, from the one or more servers, a message that a correspondence has been identified between a first unit of code in the first development environment and a second unit of code in a second development environment comprised in a second developer workspace registered with the developer matching service. The method further includes establishing, in response to receiving the message, a connection between the client and a collaboration platform comprising a social coding service that facilitates collaboration between the first development environment and the second development environment with respect to the first unit of code and the second unit of code.

In another aspect, a computer program product including one or more computer-readable storage mediums having program code embodied therewith, the program code executable by a computing device to receive developer registration information from a client device. The computer program product further includes program code to, in response to receiving the developer registration information from the client device, create a developer profile. The computer program product further includes program code to send an agent to the client device, the agent configured to monitor a development environment of the client device, collect information associated with code written in the development environment, and transfer the information associated with code written in the development environment to one or more servers. The computer program product further includes program code to receive reports of the collected information from the agent resident on the client device. The computer program product further includes program code to analyze the collected information associated with code resident on the client device and other information associated with code resident on a second device associated with a second developer profile for a correspondence between the collected information and the other information. The computer program product further includes program code to determine, based at least in part on the analyzing of the collected information and the other information, that the correspondence exists between the collected information and the other information. The computer program product further includes program code to send, based at least in part on the determining that the correspondence exists, a message associated with the correspondence to the client device.

In another aspect, a computer system includes one or more processors, one or more computer-readable memories, and one or more computer-readable storage mediums. The computer system further includes program instructions, stored on at least one of the one or more storage mediums for execution by at least one of the one or more processors via at least one of the one or more memories, to receive developer registration information from a client device. The computer system further includes program instructions, stored on at least one of the one or more storage mediums for execution by at least one of the one or more processors via at least one of the one or more memories, to, responsive to receiving the developer registration information from the client device, create a developer profile. The computer system further includes program instructions, stored on at least one of the one or more storage mediums for execution by at least one of the one or more processors via at least one of the one or more memories, to send an agent to the client device, the agent configured to monitor a development environment of the client device, collect information associated with code written by the developer, and transfer the information associated with code written by the developer to a monitoring server. The computer system further includes program instructions, stored on at least one of the one or more storage mediums for execution by at least one of the one or more processors via at least one of the one or more memories, to receive reports of the collected information from the agent resident on the client device. The computer system further includes program instructions, stored on at least one of the one or more storage mediums for execution by at least one of the one or more processors via at least one of the one or more memories, to analyze the collected information associated with code resident on the client device and other information associated with code resident on a second device associated with a second developer profile for a correspondence between the collected information and the other information. The computer system further includes program instructions, stored on at least one of the one or more storage mediums for execution by at least one of the one or more processors via at least one of the one or more memories, to, based on the analysis of the collected information and the other information, determine that the correspondence exists between the collected information and the other information. The computer system further includes program instructions, stored on at least one of the one or more storage mediums for execution by at least one of the one or more processors via at least one of the one or more memories, to, based on the determination that the correspondence exists, send to the client device a message associated with the correspondence.

The details of one or more embodiments are set forth in the accompanying drawings and the description below. Other features, objects, and advantages will be apparent from the description and drawings, and from the claims.

DETAILED DESCRIPTION

There are set forth herein examples of a method, system, and computer program product for real-time monitoring of development environments to connect developers based on similarities such as programming projects, code structure, and class modeling. Further implementations collect data about a community to assess overall trends about the development community in which the service is employed. Various embodiments disclosed herein may enable monitoring and alerting users of a code match, e.g., examples of software files, libraries, or projects that have analogous functions, structures, or purposes, among various other features and advantages.

Software developers frequently solve the same or similar problems as other developers. In doing so, the developers often end up writing code that is redundant with other code that was available to the developers but of which the developers were unaware. This becomes particularly apparent in the context of large organizations and in open source projects where different developers may, unbeknownst to each other, be working on the same feature. This "shadow IT" is costly in developer time. Developers may be working on the same problems within a different project, organization, or community, and no one would know that solutions to these common problems are being worked on redundantly by other developers. A greater sharing of code and solutions to problems can increase the efficiency of product development.

Aspects of the present disclosure utilize agents that actively monitor developer workspaces within a collaborative network to reduce code redundancy. A service that monitors the workspaces via the agents may run on a public cloud platform such as IBM Cloud®, Amazon Web Services™ (AWS), or Microsoft Azure®, or within an on-premises environment. The agent may send data to the platform, which may perform a matching profile and other methods of code comparison and code translation between users of active developers within the community who are knowingly or unknowingly working on the same or similar problems.

The service may attempt to connect developers, giving them the option to collaborate, share project data, or solutions based on current project workspaces. An agent of this disclosure may thus detect when different software developers who are available to work together (e.g., are in the same enterprise or are in open source projects) seem to be working on projects with analogous or overlapping functions, structures, or purposes, and may connect the developers with each other, thus facilitating cooperative collaboration and avoidance of duplicated effort in software development. This may be useful for open source communities and large enterprises. Various illustrative features and advantages of a user input guidance agent are further described below with reference to FIGS. 1-4.

Figure 1:
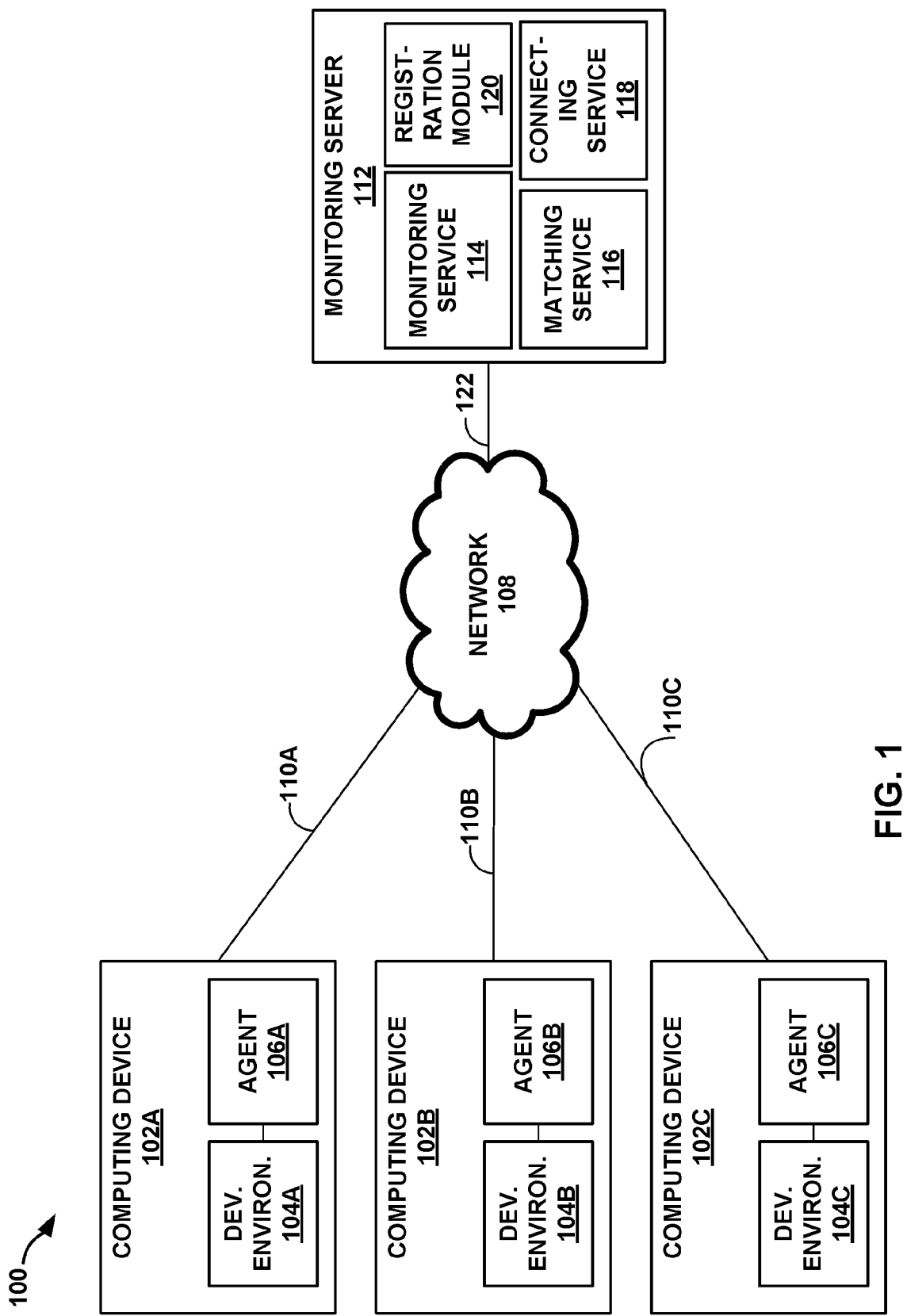
FIG. 1 is a block diagram of illustrating an exemplary system that provides an environment for real-time workspace monitoring, in one aspect of the disclosure.

FIG. 1 is a block diagram of illustrating an exemplary system 100 that provides an environment for real-time workspace monitoring, in one aspect of the disclosure. Client computing devices 102A-C may be a workstation, server, mainframe computer, notebook or laptop computer, desktop computer, tablet, smartphone, feature phone, virtual machine, or other programmable data processing apparatus of any kind. Other possibilities for client computing devices 102A-C are possible, including a computer having capabilities other than or beyond those described herein.

In this illustrative example, client computing devices 102A-C each includes a workspace including a development environment 104A-C, respectively. Client computing devices 102A-C may be representative of any arbitrary number (e.g., thousands, millions) of computing devices that may be used by developers in the same enterprise, by open source developers, or by a combination of both. In any case, client computing devices 102A-C may be geographically distributed to an indefinite extent, such that the users may not have had any prior personal contact or awareness of each other. Client computing devices 102A-C may also each download a software agent 106A-C, respectively, to their respective workspaces. Client computing devices 102A-C may download software agent 106A-C from the monitoring server 112. The development environment 104A-C may include an integrated development environment (IDE) such as Eclipse®, NetBeans®, SharpDevelop™, or Lazarus™. Software agent 106A-C may be a plug-in to the development environment (e.g., a plug-in to the Eclipse IDE). The plug-in may also be configured to analyze code repositories based on structure and comments.

Software agent 106A-C connects to the monitoring server 112 via network 108 and connections 110A-C and 122. A developer may register with a monitoring server 112 via registration module 120 and download software agent 106A-C on their respective client computing device 102A-C. A developer may opt-in to a service that monitors their workspace 104A-C in real-time via the software agent 106A-C deployed on their workstation (e.g., client computing devices 102A-C). Agent 106A-C may know or may be able to determine the local directory in which the active workspace keeps a local history for uploading real-time (or substantially real-time) versions (or updates) of their project to monitoring server 112 via monitoring service 114. Real-time uploading may occur based on when a developer saves the code (or the code is automatically saved) which can trigger agent 106A-C. Agent 106A-C may collect one or more of library references, file and directory names, code comments, file types, variable names, operating system (OS) platform, program languages (e.g., compliers and processors), and test environments (e.g., server types and browsers). Software agent 106A-C may run as a plug-in with development environment 104A-C of the developer.

Software agent 106A-C may send monitoring server 112 Hypertext Transfer Protocol (HTTP) or HTTP Secure (HTTPS) post messages (via, e.g., JavaScript Object Notation (JSON) over HTTP), through an application programming interface (API), and/or a command line interface (CLI) with periodic or continuous updates regarding collected data. Monitoring server 112 may receive these live updates/reports from agent 106A-C of the local file system at server 112.

Monitoring server 112 may then be used for comparison against other active developers within the community using matching service 116. The registration module 120 may allow for developer registration.

Registration module 120 incorporates a webpage and service and may be accessed by client computing device 102A-C. The registration may be used to build a developer profile that may be used by matching service 116 and connecting service 118 to match and connect developers. The developer profile may include a number of data points including, for example: name, project, engineering field, development area (e.g., user interface (UI), performance), programming languages, and operating systems. Monitoring server 112 may also serve or direct the developer to download agent program 106A-C.

Matching service 116 may receive reports from the plurality of agents 106A-C running on each of client computing devices 102A-C. Matching service 116 on server 112 may search, in real-time, the reports received from the plurality of agents 106A-C for community matches. Matching service 116 may use code translation techniques to compare code produced in different languages, coding styles, and for use on different systems. The matching may include similarities of programming projects, code structure, and class modeling. Matching service 116 may use the monitoring along with a combination of a user profile and the usage of search methods for comparing code. Monitoring server 112 may assess data points cataloged and weigh the likeness between other active (and inactive) developers. Likeness may be based upon a percentage level match or higher (e.g., a confidence level of 80%). Code may be compiled and then compared to other compiled code for comparison and to determine a confidence level as to the similarity between the pieces of code.

Monitoring server 112 may also connect to large (and small) public online repositories of code such as GitHub® and perform code comparisons in order to find public matches. This approach may be particularly helpful for open source project development.

In response to identifying a match, monitoring server 112 may notify one or more of the developers associated with the match. This may be done in real-time. Connecting service 118, running on monitoring server 112 or a different server in communication with monitoring server 112, may send a live alert (via e.g. email, social media) to online developers providing the option for them to connect in real-time to discuss their projects and collaborate. If developers are not currently online but active in the community (or alternatively if one or both developers are currently online or if one or both developers are inactive in the community), service 118 may message the user via a social communication preference (e.g. email, Facebook®, Skype®, short message service (SMS), instant message, phone, Rich Site Summary (RSS) feed, live chat, screen popup etc.). Connecting service 118 may provide live screen sharing, repository sharing, file transfers, and/or connections to social coding services such as Atom™, Slack®, or Screenhero™. The social coding service may facilitate collaboration between a first development environment (associated with a first unit of matched code) and a second development environment (associated with a second unit of matched code). Server 112 may facilitate connections between matched developers (using, e.g., client computing devices 102A and 102B). Alternatively, once the developers are alerted of the match, the developers (via client computing devices 102A and 102B) may connect to each other directly or to a different (or third-party) server.

Furthermore, more than two developers (e.g., three, four, etc.) may be matched by server 112. In such an instance, each of the matched developers (via their respective client computing devices 102A-C) may connect to each other directly, through a service on matching server 112, or through a third party server. These sharing features may either be based on organizational preferences/rules or preferences of the developers (e.g., whether both developers agree to share screens and/or code).

A collaboration workspace may be utilized for developers to connect. Server 112 (or a third party server) may run a collaboration workspace that may include resources, such as documents, drawings, and the like which may be accessed by multiple users of a collaboration workspace. The collaboration tools and/or resources may be included in the workspace, or the workspace may provide access through interface components. For example, a workspace may include various portal views, each of which presents an underlying tool to a user and provides access to the tool. Different combinations of collaboration tools and/or resources may be provided as various types of workspaces. To provide different combinations, templates may be provided, each of which may be used for a particular purpose.

Developers may be able to choose the level of access they want to allow the matched developer to their project. Such sharing may be based on connections to the other developer (e.g., social media connections such as LinkedIn® connections or Facebook® friends), whether they work in the same department or unit of an organization, whether the developers have worked together before. A composite likeness score may be utilized to determine whether the developers are likely to collaborate. Other considerations include security and confidentiality of the project. A developer may also be able to block another developer from collaboration regardless of how similar the projects match for personal or security concerns.

Such collaboration may be a virtualized way of accelerating peer programming for individual developers in public/private/hybrid cloud, open source, and cross-enterprise environments. Alternatively, agent processes 106A-C may only send data periodically (rather than continuously), e.g., daily to monitoring server 112. The matching service 116 on server 112 may run periodically rather than continuously e.g., batch processing translation and analysis of code daily (e.g., nightly) or weekly rather than continuously in real-time.

Monitoring server 112 may be able to catalog the data produced by a variety of developers across multiple projects and development environments. This data can be analyzed to produce reports (including anonymous reports) as output about the developer data points that monitoring server 112 analyzes for making inferences about development trends within the community. The reports may assess overall trends about the development community in which the service is employed. This may allow for benefits outside of connecting developers and reducing or preventing code redundancy including assessment of development talent (developer quality), cost savings, and determination of the frequency with which an organization solves similar problems across organizations, determining trends on projects, make inferences or predictions about future needs, and identify gaps. The analysis may occur on a natural language processing, information retrieval, and/or machine learning server such as Watson™ by IBM® Corporation.

Figure 2:
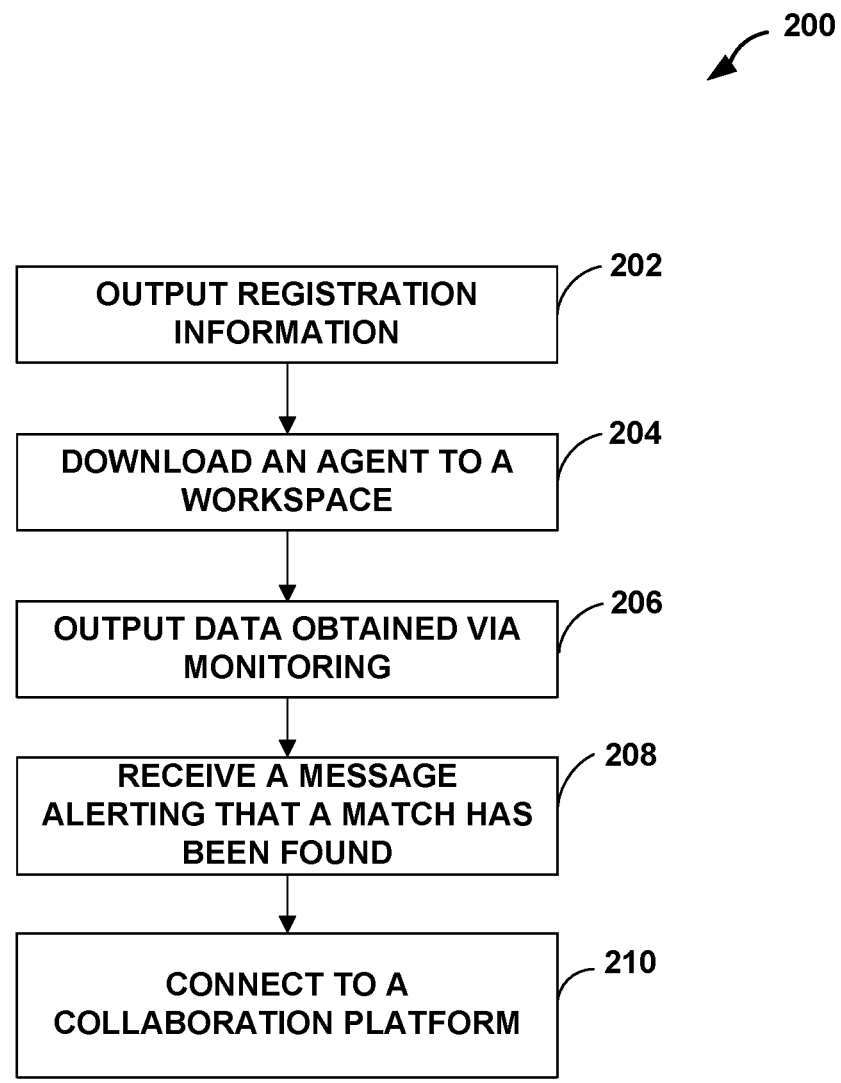
FIG. 2 is a flowchart illustrating operation of a method for a community assessment via real-time workspace monitoring of FIG. 1, in one aspect of the disclosure.

FIG. 2 is a flowchart illustrating operation of a method for a community assessment via real-time workspace monitoring of FIG. 1, in one aspect of the disclosure. Method 200 may include functions encoded in executable instructions stored as part of program code, and which also may be stored in persistent data storage 88, loaded into memory 86 and executed by processor unit 84 of FIG. 4, according to an illustrative example. Method 200 may be performed by a computing device, such as one of client computing devices 102A-C of FIG. 1, each of which is an example of computing device 80 of FIG. 4, including by one or more processors of a computing device carrying out computer-executable instructions which may be referred to here as being performed by a computing device.

Method 200 may include one of client computing devices 102A-C ("client computing device 102") outputting, for communication to one or more servers 112, a first developer registration information for a developer matching service (202). Registration information of a first developer of a plurality of developers for a developer matching service may be configured to connect the plurality of developers that have similar code structures or functionality. Registering the first developer may include receiving input from the first developer regarding a level of access to allow a matched developer to a respective project. The level of access may include sharing a source code repository, screen sharing, and/or file transfers. Registering the first developer may also include opting the first developer into a developer matching service 116.

Client computing device 102 may then download a respective agent 106 (e.g., agents 106A-C) associated with the developer matching service 116 to a developer workspace on client computing device 102 (204). Agent 106 may be configured to monitor a developer workspace on client computing device 102. The monitoring of the workspace by agent 106 may be continuous or intermittent. The developer workspace may include a first development environment. The first development environment may include an IDE, and agent 106 may include a plug-in for the IDE. Agent 106 may also be configured to determine a local directory and/or obtain access to the local files of the workspace of the first developer.

Client computing device 102 may output data obtained via the monitoring of the first developer workspace via agent 106, to the one or more servers 112 (206). The transmission may be transmitted using JavaScript Object Notation (JSON) over Hypertext Transfer Protocol (HTTP) by client computing device 102. The data obtained via the monitoring may include library references, file and directory names, code, comments, file types, variable names, or any other type of data relevant to software development produced by the first developer, for example.

Client computing devices 102 may receive from monitoring server 112 a message that a correspondence has been identified between a first unit of code in the first development environment and a second unit of code in a second development environment included in a second developer workspace registered with the developer matching service 116 (208). The message may include an alert to the first (and/or second) developer that a match has been found between a solution developed by the first developer and the solution developed by a second developer. This match may indicate that redundant code is being developed by the first and second developers. Matching service 116 may also send correspondence messages to other developers including a manager of the first and/or second developers or a project manager(s) for the particular solutions being developed.

Client computing device 102 may establish a connection between client computing device 102 and a collaboration platform in response to receiving the message (210). Both the first developer and the second developer may connect via the collaboration platform in response to receiving the message. The collaboration platform may include a social coding service that may facilitate collaboration between the first development environment and the second development environment with respect to source code, such as the first unit of code, that is loaded or stored on the first development environment, and other source code such as the second unit of code that is loaded or stored on the second development environment. This connection may be based at least in part on access levels of one or both of the developers.

Figure 3:
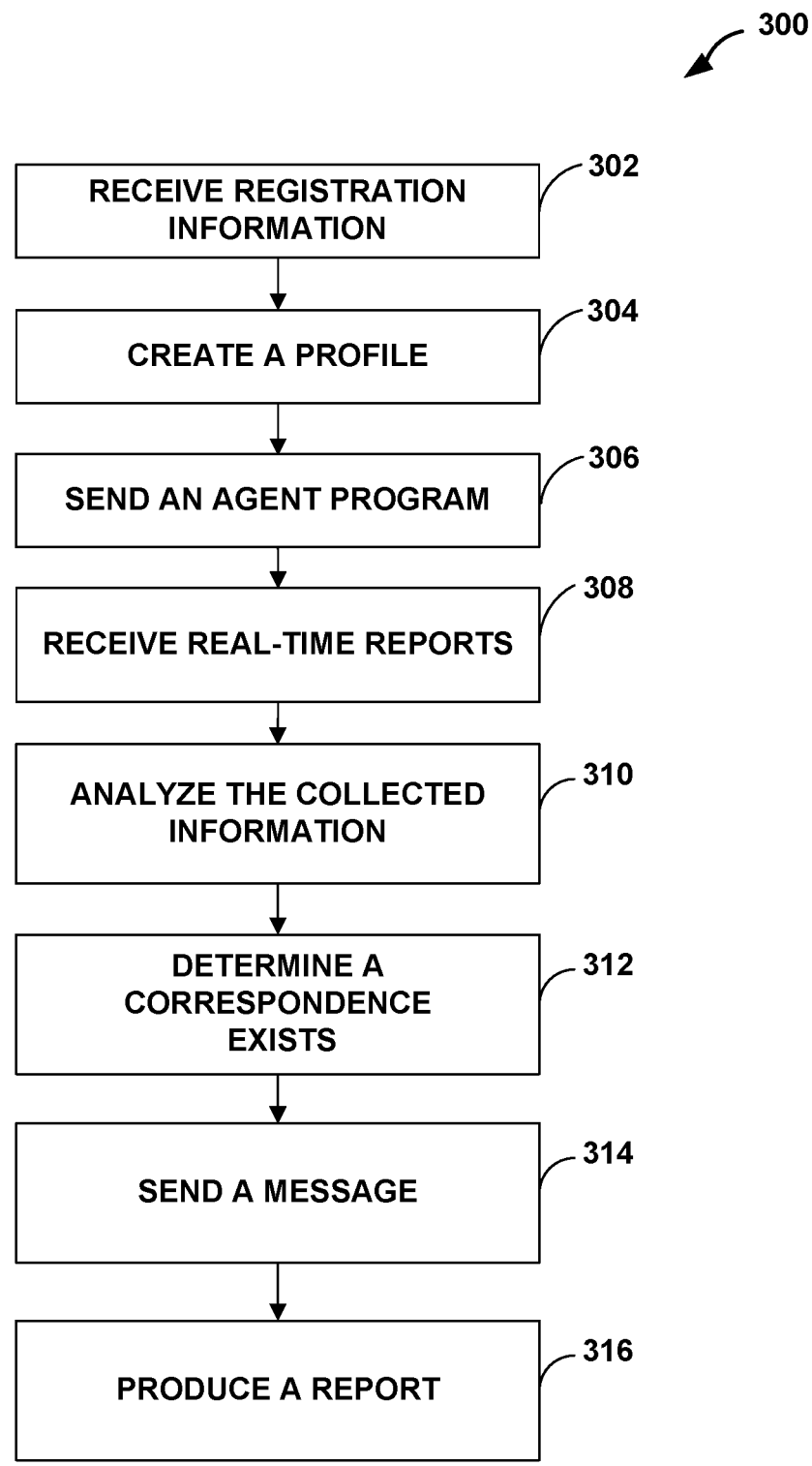
FIG. 3 is a flowchart illustrating operation of a method for a community assessment via real-time workspace monitoring of FIG. 1, in one aspect of the disclosure.

FIG. 3 is a flowchart illustrating operation of a method for a community assessment via real-time workspace monitoring of FIG. 1, in one aspect of the disclosure. Method 300 may include functions encoded in executable instructions stored as part of program code, and which also may be stored in persistent data storage 88, loaded into memory 86 and executed by processor unit 84 of FIG. 4, according to an illustrative example. Method 300 may be performed by a computing device, such as monitoring server 112 of FIG. 1, which is an example of computing device 80 of FIG. 4, including by one or more processors of a computing device carrying out computer-executable instructions which may be referred to here as being performed by a computing device.

Monitoring server 112 may receive developer registration information from a device, such as client computing device 102 (302). The developer registration information may correspond to information about a developer. Monitoring server 112 may create a developer profile responsive to receiving the developer registration information from client computing device 102 (304). The creation of the profile may include registration of a developer/the workspace associated with the developer information for a matching service. The developer registration information may include a current project and programming languages used.

Monitoring server 112 may send agent program 106 to client computing device 102 (306). Agent program 106 may be configured to continuously monitor a development environment of client computing device 102, collect information associated with code written by the developer, and transfer the information associated with code written by the developer to monitoring server 112. Agent program 106 may be aware of a local workspace location on a local filesystem of client computing device 102. The awareness of agent program 106 of the local workspace location may enable agent program 106 the ability to monitor the local workspace location for code updates. The code updates may include automatic saves from a development environment program.

Monitoring server 112 may receive reports of the collected information from the agent program 106 resident on client computing device 102 (308). The reports of the collected information may be received by monitoring server 112 in real-time or be continuously received. Monitoring server 112 may analyze the collected information associated with code resident on the client computing device 102A-C and other information associated with other code resident on a second client computing device 102A-C associated with a second developer profile for a correspondence between the collected information and the other information (310). Code resident on the client device may include code saved to data storage of the client device, accessible to be loaded to memory of the client device, and/or code produced via the workspace or IDE of the client device, for example. The code may have been developed using development environment 104A-C, and the other code may have been developed using a different development environment 104A-C. Monitoring server 112 may translate code across a plurality of programming languages. Monitoring server 112 may make use of a confidence level to determine the similarity between pieces of code.

The code translation of monitoring server 112 (or as a feature of the agent program 106 resident on the client computing device 102) may extract source file statements written in a programming language and convert the statements into a language independent format. Monitoring server 112 may then compare the language independent code from a number of developers and from other public repositories and internal knowledge bases in the language independent code.

Monitoring server 112 may determine that the correspondence exists between the collected information (312). The determination that a correspondence exists may be based on the analysis of the information (associated with the code resident on the client computing device 102A-C associated with the developer profile) and other information (associated with the other code resident on the other client computing device 102A-C associated with the second developer profile).

The correspondence determination by monitoring server 112 may utilize source code comparison to determine matches between developers. The source code comparison may include language independent code from a source code translation process, can utilize a pre-matching manipulation, or can utilize raw source code directly from the client computing device 102 (without prior translation or manipulation). Source code comparison may include analyzing identifying concepts in a plurality of corpuses, determining a frequency of the concepts. Using the frequencies to create a frequency file and compare portions of the corpuses by the frequency of the concepts. A difference analysis and a combination of content and spectral analysis may be employed.

Monitoring server 112 may send to client computing device 102 a message associated with the correspondence (314). Sending the message may be based on the analysis of the collected information. The message may indicate that a correspondence has been determined between the developer profile and the second developer profile. The message may indicate methods by which a developer associated with the developer profile may connect with the second developer associated with the second developer profile. The message may also prompt the user for an access level to allow the second developer associated with the second developer profile for information sharing or blocking. Monitoring server 112 may analyze a plurality of data including the information and the other information to produce a report identifying trends in a development community (316). Trends in coding styles may be determined based on the usage of library calls in the development code. This data may be stored in a database or other data store where queries may be run to calculate and chart the practices and coding habits of developers over time based on factors such as markets, client environments, or projects, for example. Java® programs may be one way of running analysis against large open source or on-premise code repositories as a background process on monitoring server 112. A Java® program may act as a collector of the data for returning it to a database or other data store (e.g., a MongoDB® implementation) where other Java programs may analyze and discover these trends in real-time as the service grows, for example. Computing devices 102A-C may retrieve the report (or a portion of the report) identifying trends in the development community.

Figure 4:
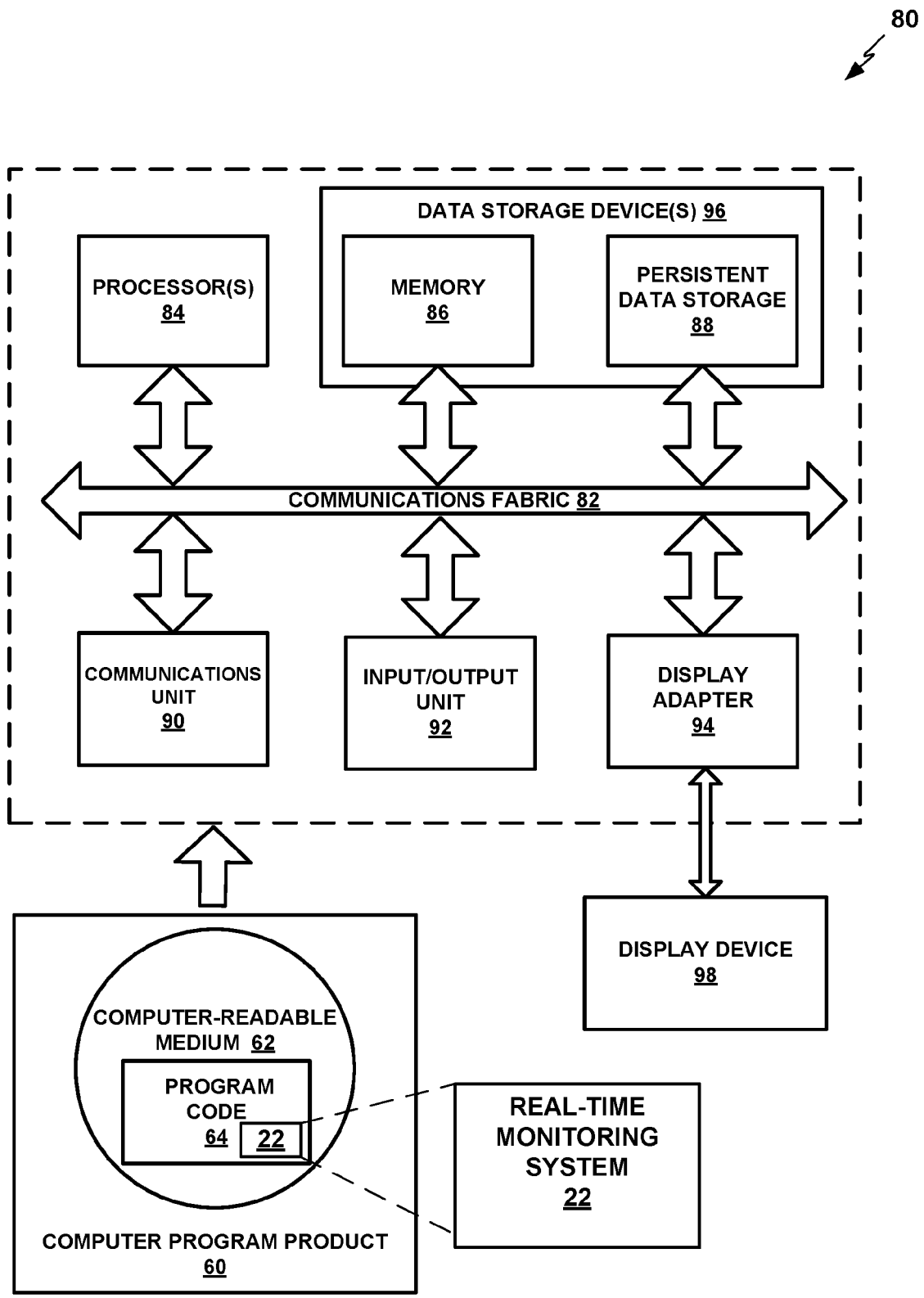
FIG. 4 is a block diagram of a computing device that may be used to execute a real-time monitoring system, in one aspect of this disclosure.

FIG. 4 is a block diagram of a computing device 80 that may be used to execute any one or more of development environments 104A-C, agents 106A-C, monitoring service 114, matching service 116, connecting service 118, and/or registration module 120, in various aspects of this disclosure. Computing device 80 may be a client computing device such as computing device 102A, 102B, or 102C, or a server such as monitoring server 112, in various examples of this disclosure. Computing device 80 may also be any server for providing an enterprise business intelligence application in various examples; including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 4, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may include one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms.

While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage mediums. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical computer-readable data storage devices. Data storage 96 may include any of various forms of volatile memory that may require being periodically electrically refreshed to maintain data in memory, while those skilled in the art will recognize that this also constitutes an example of a physical computer-readable data storage device. Executable instructions may be stored on a medium when program code is loaded, stored, relayed, buffered, or cached on a physical medium or device, including if only for only a short duration or only in a volatile memory format.

Processor unit 84 can also be suitably programmed to read, load, and execute computer-executable instructions or computer-readable program code for any one or more of development environments 104A-C, agents 106A-C, monitoring service 114, matching service 116, connecting service 118, and/or registration module 120, in various aspects of this disclosure, as described in greater detail above. This program code may be stored on memory 86, persistent data storage 88, or elsewhere in computing device 80. This program code may also take the form of program code 64 stored on computer-readable medium 62 included in computer program product 60, and may be transferred or communicated, through any of a variety of local or remote means, from computer program product 60 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 60, which includes a computer-readable medium 62 having computer program code 64 stored thereon. For example, computer program product 60 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 62 may include any type of optical, magnetic, or other physical medium that physically encodes program code 64 as a binary series of different physical states in each unit of memory that, when read by computing device 80, induces a physical signal that is read by processor 84 that corresponds to the physical states of the basic data storage elements of storage medium 62, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions included in program code 64.

In some illustrative examples, program code 64 may be downloaded over a network to data storage 96 from another device or computer system for use within computing device 80. Program code 64 including computer-executable instructions may be communicated or transferred to computing device 80 from computer-readable medium 62 through a hard-line or wireless communications link to communications unit 90 and/or through a connection to input/output unit 92. Computer-readable medium 62 including program code 64 may be located at a separate or remote location from computing device 80, and may be located anywhere, including at any remote geographical location anywhere in the world, and may relay program code 64 to computing device 80 over any type of one or more communication links, such as the Internet and/or other packet data networks. The program code 64 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 64 may be transmitted from a source computer-readable medium 62 over mediums, such as communications links or wireless transmissions containing the program code 64. Program code 64 may be more or less temporarily or durably stored on any number of intermediate physical computer-readable devices and mediums, such as any number of physical buffers, caches, main memory, or data storage components of servers, gateways, network nodes, mobility management entities, or other network assets, en route from its original source medium to computing device 80.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   outputting, with one or more processing devices of a client, for communication to one or more servers, a first developer registration information for a developer matching service;
   downloading, with the one or more processing devices of the client, an agent associated with the developer matching service to a first developer workspace on the client, wherein the first developer workspace comprises a first development environment, and wherein the agent is configured to monitor the first developer workspace;
   outputting, with the one or more processing devices of the client, for communication to the one or more servers, data obtained from monitoring of the first developer workspace by the agent;
   receiving, with the one or more processing devices of the client, from the one or more servers, a message that a correspondence has been identified between a first unit of code in the first development environment and a second unit of code in a second development environment comprised in a second developer workspace registered with the developer matching service; and
   establishing, with the one or more processing devices of the client, in response to receiving the message, a connection between the client and a collaboration platform comprising a social coding service that facilitates collaboration between the first development environment and the second development environment with respect to the first unit of code and the second unit of code.

2. The method of claim 1, wherein the agent comprises a plug-in to the first development environment.

3. The method of claim 1 further comprising downloading, from the one or more servers, a report identifying trends in a development community, the report based at least in part on data obtained from monitoring of the first developer workspace by the agent.

4. The method of claim 1, further comprising:
   receiving a user input indicating a level of access for a respective project to allow matched developers to the respective project; and
   incorporating the indicated level of access for the respective project as part of the first developer registration information.

5. The method of claim 4, wherein the level of access comprises at least one of shared access to a source code repository, configuration for screen sharing, or configuration for file transfers.

6. The method of claim 1, wherein the data obtained from monitoring comprises one or more of library references, file and directory names, code comments, file types, or variable names detected in the first developer workspace.

7. The method of claim 1, wherein the first developer registration information comprises a selectable opt-in to functions of the first developer matching service.

8. The method of claim 1, wherein the agent is configured to monitor a local directory of the first developer workspace.

9. The method of claim 1, wherein outputting the data for communication to the one or more servers comprises outputting the data in JavaScript Object Notation (JSON) over Hypertext Transfer Protocol (HTTP).

10. A computer program product comprising one or more computer-readable storage mediums having program code embodied therewith, the program code executable by a computing device to:
    receive developer registration information from a client device;
    responsive to receiving the developer registration information from the client device, create a developer profile;
    send an agent to the client device, the agent configured to monitor a development environment of the client device, collect information associated with code written in the development environment, and transfer the information associated with code written in the development environment to one or more servers;
    receive reports of the collected information from the agent resident on the client device;
    analyze the collected information associated with code resident on the client device and other information associated with code resident on a second device associated with a second developer profile for a correspondence between the collected information and the other information;
    determine, based at least in part on the analyzing of the collected information and the other information, that the correspondence exists between the collected information and the other information; and
    send, based at least in part on the determining that the correspondence exists, a message associated with the correspondence to the client device.

11. The computer program product of claim 10, wherein the program code is further executable by the computing device to:
    analyze a plurality of data comprising the collected information and the other information to produce a report identifying trends in a development community.

12. The computer program product of claim 10, wherein the agent has communicative access to a local workspace location on a local filesystem on the client device.

13. The computer program product of claim 12, wherein the communicative access of the agent of the local workspace location configures the agent to monitor the local workspace location for code updates.

14. The computer program product of claim 13, wherein configuring the agent to monitor the local workspace location for code updates comprises configuring the agent to monitor automatic saves from a development environment program.

15. The computer program product of claim 10, wherein analyzing the collected information comprises:
using a confidence level to determine a similarity between units of code.

16. The computer program product of claim 10, wherein the developer registration information comprises current project information and information on programming languages used.

17. A computer system comprising:
one or more processors, one or more computer-readable memories, and one or more computer-readable storage mediums;
program instructions, stored on at least one of the one or more storage mediums for execution by at least one of the one or more processors via at least one of the one or more memories, to receive developer registration information from a client device;
program instructions, stored on at least one of the one or more storage mediums for execution by at least one of the one or more processors via at least one of the one or more memories, to, responsive to receiving the developer registration information from the client device, create a developer profile;
program instructions, stored on at least one of the one or more storage mediums for execution by at least one of the one or more processors via at least one of the one or more memories, to send an agent to the client device, the agent configured to monitor a development environment of the client device, collect information associated with code written by the developer, and transfer the information associated with code written by the developer to a monitoring server;
program instructions, stored on at least one of the one or more storage mediums for execution by at least one of the one or more processors via at least one of the one or more memories, to receive reports of the collected information from the agent resident on the client device;
program instructions, stored on at least one of the one or more storage mediums for execution by at least one of the one or more processors via at least one of the one or more memories, to analyze the collected information associated with code resident on the client device and other information associated with code resident on a second device associated with a second developer profile for a correspondence between the collected information and the other information;
program instructions, stored on at least one of the one or more storage mediums for execution by at least one of the one or more processors via at least one of the one or more memories, to, based on the analysis of the collected information and the other information, determine that the correspondence exists between the collected information and the other information; and
program instructions, stored on at least one of the one or more storage mediums for execution by at least one of the one or more processors via at least one of the one or more memories, to send, based on the determination that the correspondence exists, to the client device a message associated with the correspondence.

18. The computer system of claim 17, further comprising program instructions, stored on at least one of the one or more storage mediums for execution by at least one of the one or more processors via at least one of the one or more memories, to analyze a plurality of data comprising the information and the other information to produce a report identifying trends in a development community.

19. The computer system of claim 17, wherein the program instructions to analyze the collected information comprise:
program instructions to use a confidence level to determine a similarity between pieces of code.

20. The computer system of claim 17, wherein the developer registration information comprises current project information and information on programming languages used.

* * * * *